(12) United States Patent
Tarighat Mehrabani (10) Patent No.: US 11,412,471 B2
(45) Date of Patent: Aug. 9, 2022

(54) REPEATER DEVICE WITH SLAVE MODE (71) Applicant: AR & NS Investment, LLC, Newport Coast, CA (US)

(72) Inventor: Alireza Tarighat Mehrabani, Los Angeles, CA (US)

(73) Assignee: AR & NS Investment, LLC, Newport Coast, CA (US)

( * ) Notice: Subject to any disclaimer, the term of this patent is extended or adjusted under 35 U.S.C. 154(b) by 0 days.

(21) Appl. No.: 17/235,436

(22) Filed: Apr. 20, 2021

(65) Prior Publication Data

US 2021/0329581 A1 Oct. 21, 2021

Related U.S. Application Data

(60) Provisional application No. 63/012,553, filed on Apr. 20, 2020.

(51) Int. Cl.
*H04W 56/00* (2009.01)
*H04B 7/155* (2006.01)

(52) U.S. Cl.
CPC .... *H04W 56/0015* (2013.01); *H04B 7/15507* (2013.01); *H04B 7/15542* (2013.01)

(58) Field of Classification Search
CPC ........... H04W 56/0015; H04B 7/15507; H04B 7/15542; H04B 7/15557
See application file for complete search history.

(56) References Cited

U.S. PATENT DOCUMENTS

| | | | | |
|---|---|---|---|---|
| 9,288,837 B2* | 3/2016 | Yanagihara | ........... | H04W 84/20 |
| 10,070,376 B2* | 9/2018 | Lindoff | ............ | H04W 56/0015 |
| 10,187,138 B2* | 1/2019 | Sonobe | .................... | H04B 7/14 |
| 10,491,292 B2* | 11/2019 | Kawabata | ........ | H04B 10/25752 |
| 2004/0235506 A1* | 11/2004 | Roettger | ............. | H04B 7/2606 455/500 |
| 2007/0064638 A1* | 3/2007 | Banniza | ............. | H04B 7/15507 455/13.1 |
| 2007/0147484 A1* | 6/2007 | Lee | ......................... | H04B 1/60 375/149 |
| 2008/0013473 A1* | 1/2008 | Proctor, Jr. | ........ | H04B 7/15507 455/14 |
| 2011/0222428 A1* | 9/2011 | Charbit | ................ | H04B 7/2606 370/252 |
| 2012/0026996 A1* | 2/2012 | Yamaguchi | ............ | H04B 1/406 370/338 |

(Continued)

*Primary Examiner* — Dominic E Rego
(74) *Attorney, Agent, or Firm* — Chip Law Group (57) ABSTRACT

A repeater device that includes control circuitry, which activates a slave mode in the repeater device based on a request received from a first wireless communication device. The control circuitry receives a first radio frequency signal from a base station and acquire timing information of the base station. The control circuitry executes a network time synchronization with the base station based on the acquired timing information of the base station. The repeater device in the slave mode acts as a slave of the base station based on the network time synchronization. The control circuitry executes a synchronization with a modem of the first wireless communication device in which the repeater device in the slave mode follows radio signals and a radio state of the modem of the first wireless communication device.

20 Claims, 6 Drawing Sheets

(56) References Cited

U.S. PATENT DOCUMENTS

| | | | | |
|---|---|---|---|---|
| 2015/0282223 | A1* | 10/2015 | Wang | H04W 76/11 |
| | | | | 455/41.2 |
| 2017/0026896 | A1* | 1/2017 | Enomoto | H04W 92/18 |
| 2017/0366249 | A1* | 12/2017 | Van Oost | H04B 7/15557 |
| 2018/0160382 | A1* | 6/2018 | Hou | H04W 4/00 |
| 2020/0196372 | A1* | 6/2020 | Ouyang | H04W 76/25 |
| 2020/0395998 | A1* | 12/2020 | Yamamoto | H04B 7/15557 |
| 2021/0075497 | A1* | 3/2021 | Tekgul | H04W 40/04 |
| 2021/0136628 | A1* | 5/2021 | Uchiyama | H04W 92/08 |
| 2021/0194569 | A1* | 6/2021 | Ray Chaudhuri | H04B 7/15507 |

* cited by examiner

REPEATER DEVICE WITH SLAVE MODE

CROSS-REFERENCE TO RELATED APPLICATIONS/INCORPORATION BY REFERENCE

This Application makes reference to, claims priority to, and claims benefit from U.S. Provisional Application Ser. No. 63/012,553, which was filed on Apr. 20, 2020.

The above referenced Application is hereby incorporated herein by reference in its entirety.

FIELD OF TECHNOLOGY

Certain embodiments of the disclosure relate to telecommunication systems. More specifically, certain embodiments of the disclosure relate to a repeater device, a wireless communication device for controlling the repeater device, and methods of operating the repeater device.

BACKGROUND

Next generation of wireless telecommunication technologies, for example, current 5G (both non-standalone or standalone) or upcoming 6G, are being developed to deliver much faster data rate as compared to long term evolution (LTE or 4G) technology. In telecommunications, a repeater device or system is used to extend the range of wireless radio frequency signals and/or improve the weak signals, if any, at a specific installation site, in a cellular network. In certain scenarios, when a conventional repeater is installed, it covers a certain area, where sometimes different users share the available repeater enabled resources (e.g., enhanced signals and/or bandwidth). In certain scenarios, different users may have different needs and preferences, and a given user may not want to share repeater enabled resources with other users. Moreover, conventional repeater devices or systems are known to cause interference with existing air waves and impact the overall cellular network quality.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

A repeater device with a slave mode, a method of operating the repeater device, and a wireless communication device for controlling the repeater device, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION OF THE DISCLOSURE

Certain embodiments of the disclosure may be found in a repeater device with a slave mode, a method of operating the repeater device, and a wireless communication device for controlling the repeater device. The repeater device and the method of the present disclosure provides an enhanced experience to a user in terms of network performance without causing any interference with existing air waves and without impacting the overall cellular network quality. The repeater device may not interfere or affect the operations of other communication devices present in a same area covered by the slave device, and is capable of supporting only a dedicated user (e.g., only one master or authorized user, such as the wireless communication device of the present disclosure) in the same area. For example, the repeater device may work only with a smartphone "A" of a user "B" and accessories of the smartphone "A" even if many active wireless communication devices are present in the vicinity of the smartphone "A". Furthermore, the repeater device of the present disclosure improves data transfer rates between a base station and the disclosed wireless communication device by use of the repeater device without causing any interference or affecting the operations of other wireless communication devices present in vicinity of the wireless communication device, thereby increasing network performance. In the following description, reference is made to the accompanying drawings, which form a part hereof, and in which is shown, by way of illustration, various embodiments of the present disclosure.

Figure 1:
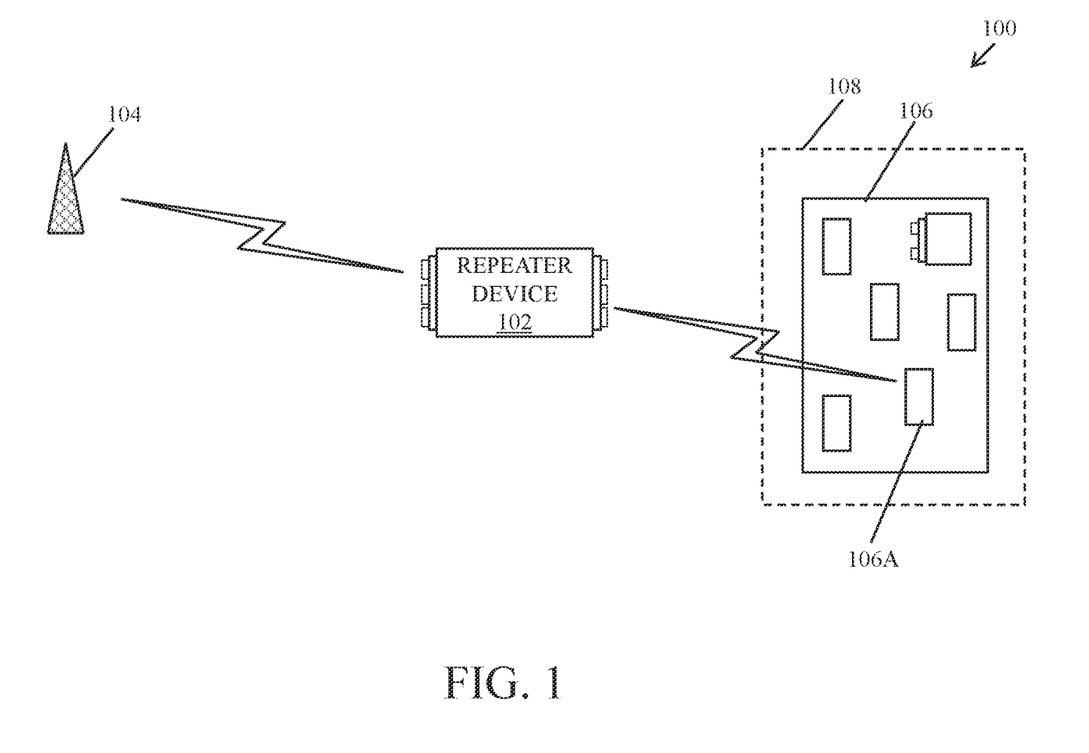
FIG. 1 is a network environment of an exemplary repeater device, in accordance with an exemplary embodiment of the disclosure.

FIG. 1 is a network environment of an exemplary repeater device, in accordance with an exemplary embodiment of the disclosure. With reference to FIG. 1, there is shown a network environment 100. The network environment 100 may include a repeater device 102, a base station 104, a plurality of wireless communication devices 106 present in a given area, such as a physical enclosure 108. There is further shown a first wireless communication device 106A, which is one of the plurality of wireless communication devices 106.

The repeater device 102 may also be referred to as a slave repeater device as the repeater device 102 includes a slave mode. The repeater device 102 may include suitable logic, circuitry, and/or interfaces that may be configured to execute network time synchronization with the base station 104. The repeater device 102 may be controlled exclusively by the first wireless communication device 106A when the slave mode is activated in the repeater device 102, where the repeater device 102 acts as a slave of the first wireless communication device 106A and does not cause any interference or affect any operations of other wireless communication devices of the plurality of wireless communication devices 106 present in vicinity of the first wireless communication device 106A (e.g. a smartphone). In an implementation, the repeater device 102 may operate in mmWave radio frequency range for cellular communication. In another implementation, the repeater device 102 may support multiple and a wide range of frequency spectrum, such as 3G, 4G, 5G NR, or true 5G. The repeater device 102 is programmable and upgradeable to operate in new wireless communication frequency range. For 5G NR, there may be two NR frequency Ranges (frequency range 1 and 2) that may be utilized for practical implementations. Frequency range 1 may overlap and extend 4G LTE frequencies, operating from 450 MHz to 6,000 MHz, which is also commonly referred to as NR or sub-6 gigahertz (GHz). Frequency range 2 operates at a much higher about 24 GHz to 52 GHz, which is commonly also referred to as millimeter wave (mmWave), although 'millimeter' frequency length typically begins at 30 GHz. Examples of the repeater device 102 may include, but is not limited to a 5G wireless access point, an evolved-universal terrestrial radio access-new radio (NR) dual connectivity (EN-DC) device, a NR-enabled repeater device, a NR-enabled repeater device or system.

The base station 104 may include suitable logic, circuitry, and/or interfaces that may be configured to communicate with the plurality of wireless communication devices 106 over a cellular network, for example, 4G, 5G, or any cellular network. The base station 104 may be further configured to communicate specifically with the first wireless communication device 106A via the repeater device 102. Multiple base stations corresponding to one service provider, may be geographically positioned to cover specific geographical areas. Typically, bandwidth requirements serve as a guideline for a location of a base station and the count of base stations may be dependent on, for example, population density and geographic irregularities, such as buildings and mountain ranges, which may interfere with radio frequency signals (or beams of radio frequency signals). The repeater device 102 may be deployed between the base station 104 and the plurality of wireless communication devices 106 to mitigate lack of line-of-sight (LOS) or other communication issues between the base station 104, and one or more wireless communication devices of the plurality of wireless communication devices 106. Examples of the base station 104 may include, but is not limited to, an evolved Node B (eNB), a Next Generation Node B (gNB), and the like.

Each of the plurality of wireless communication devices 106 may refer to a telecommunication hardware used by an end-user to communicate. Alternatively stated, each of the plurality of wireless communication devices 106 may refer to a combination of mobile equipment and subscriber identity module (SIM). In some embodiments, one or more wireless communication devices of the plurality of wireless communication devices 106 may be a part of a consumer electronic device, such as a smart TV, a media player, a game console, and the like. Examples of each of the plurality of wireless communication devices 106 (including the first wireless communication device may include, but are not limited to a smartphone, a mobile communication equipment, a customer premise equipment, a high-definition media device, or any other customized hardware for telecommunication. The physical enclosure 108 may refer to a building or a defined physical area in which the plurality of wireless communication devices 106 are present.

In operation, the repeater device 102 may be configured to receive a first radio frequency signal from the base station 104. The repeater device 102 may be further configured to acquire a current timing of the base station 104 for network time synchronization. In an example, time synchronization may be a distribution of an absolute time reference to one or more real-time clocks, where synchronized clocks have a common epoch timescale. The repeater device 102 may be configured to synchronize (i.e., sync) with the base station 104, where the repeater device 102 then acts as a slave of the base station 104. In other words, based on the synchronization, the repeater device 102 may be configured to function as a remote antenna for the base station 104 or a remote radio for the base station 104. In some embodiments, phase and frequency synchronization may also be performed. In some implementations, the repeater device 102 may be configured to synchronize (i.e., sync) with the base station 104 as default when the repeater device 102 is powered ON without waiting for any operating mode change signal from the first wireless communication device 106A. Alternatively, in some implementations, the repeater device 102 may be configured to synchronize (i.e., sync) with the base station 104 when the slave mode is activated in the repeater device 102.

In a case where the first wireless communication device 106A (e.g., the smartphone or a high-definition media device) wants to communicate with a cellular network, a network mode of the modem of the first wireless communication device 106A is switched or turned ON from a sleep mode to active mode (i.e., the modem is activated), which in turn activates radio (e.g., is able to receive radio frequency signals for initial access). Thereafter, the first wireless communication device 106A may become attached to the cellular network (i.e., a carrier frequency may be assigned to the first wireless communication device 106A by the base station 104). Once the first wireless communication device 106A becomes attached to the cellular network, data communication may be executed. In other words, the first wireless communication device 106A may be in a radio resource control (RRC) connected state to the base station 104 over the cellular network.

In certain scenarios, the first wireless communication device 106A may want to communicate (send/receive) a huge amount of data (e.g., for data communication in a multi-gigabit data rate) over the cellular network, which may be difficult or very limiting over the existing connection over the cellular network without the repeater device 102 (or via the repeater device 102 that is in a normal mode providing signals to the plurality of wireless communication devices 106). In such scenarios, the first wireless communication device 106A may be configured to activate a slave mode in the repeater device 102. The slave mode refers to a new operating mode of the repeater device 102, in which the repeater device 102 operates exclusively (i.e. works only) with the first wireless communication device 106A or electronic accessories associated with the first wireless communication device 106A and does not cause any interference or affect any operations of other wireless communication devices of the plurality of wireless communication devices 106 present in vicinity of the first wireless communication device 106A (e.g. the smartphone). In this regard, the slave mode of the repeater device 102 may be referred to as a dedicated communication or operating mode.

In order to activate the slave mode, the first wireless communication device 106A may be configured to execute a search to discover the repeater device 102. Based on the executed search, the first wireless communication device 106A may be configured to send a request to establish a wireless connection (i.e., a communicative coupling) with the repeater device 102. In accordance with an embodiment, a plurality of parameters (e.g., control information) may be communicated by the first wireless communication device 106A to the repeater device 102 even before a wireless connection is established between the repeater device 102 and the first wireless communication device 106A (e.g., the smartphone). For example, when the modem of the first wireless communication device 106A is activated, the first wireless communication device 106A may start searching for devices, such as the repeater device 102, which is trying to connect to the first wireless communication device 106A.

The repeater device 102 is further configured to establish the wireless connection with a dedicated communication device, such as the first wireless communication device 106A (e.g., a smartphone). In an example, the repeater device 102 may be configured to execute a pairing with the first wireless communication device 106A. Specifically, the pairing (or communicative coupling) is executed with a modem (e.g., a 5G modem or a 4G and 5G capable radio frequency chip) of the first wireless communication device 106A. The wireless connection is established between the first wireless communication device 106A and the repeater device 102 over a wireless channel. Examples of the wireless channel include, but is not limited to, an infrared channel, a magnetic coupling, a light-fidelity based connection, a Wi-Fi based connection, a sub-6 GHz (e.g., 5 GHz) frequency channel, a 10 GHz, or a 60 GHz channel or another wireless channel that is different from a cellular channel. Based on the established communication with the dedicated communication device such as the first wireless communication device 106A, the repeater device 102 operates exclusively (i.e. works only) with the first wireless communication device 106A or electronic accessories associated with the first wireless communication device 106A and does not cause any interference or affect any operations of other wireless communication devices of the plurality of wireless communication devices 106 present in vicinity of the first wireless communication device 106A (e.g. the smartphone).

In order to make the repeater device 102 operate exclusively with the first wireless communication device 106A in the slave mode, the first wireless communication device 106A may be configured to communicate an operating mode change signal to the repeater device 102. The operating mode change signal may be sent to change the normal mode (i.e., a first operating mode) to the slave mode in the repeater device 102. The repeater device 102 is further configured to receive the operating mode change signal from the first wireless communication device 106A based on the established communication with the first wireless communication device 106A. In some embodiments, the operating mode change signal may further include the plurality of parameters to further synchronize with the first wireless communication device 106A. Alternatively, in another implementation, the plurality of parameters are shared by the first wireless communication device 106A to the repeater device 102 even before the wireless connection is established between the repeater device 102 and the first wireless communication device 106A (e.g. the smartphone), as discussed above.

The repeater device 102 is further configured to synchronize with the modem of the first wireless communication device 106A, where the repeater device 102 acts as a slave of the first wireless communication device 106A based on the activation of the slave mode at the repeater device 102. In a case where the repeater device 102 is synchronized with the modem of the first wireless communication device 106A, the repeater device 102 follows radio signal and a radio state of the modem of the first wireless communication device 106A. In other words, the repeater device 102 acts as a remote radio (e.g., remote modem) of the first wireless communication device 106A, where the repeater device 102 is re-configured to operate on almost same timing and operate almost same or similar feature as of the first wireless communication device 106A (specifically, modem/radio of the first wireless communication device 106A). For example, whenever the first wireless communication device 106A (i.e., modem of the first wireless communication device 106A) comes out of sleep mode or idle mode, and becomes activated, the repeater device 102 also activates in real time or near real time. The repeater device 102 may be configured to follow and synchronize the radio signaling from the first wireless communication device 106A. The modem of the first wireless communication device 106A may be a front-end radio frequency circuitry or a part thereof. The repeater device 102 follows such signaling (i.e., a current state of the radio state), and becomes dedicated exclusively to the first wireless communication device 106A. Thus, in such scenarios, only the first wireless communication device 106A may be configured to control the repeater device 102. For example, any input command may be provided to the repeater device 102 by the first wireless communication device 106A. The first wireless communication device 106A may be configured to control various operations of the repeater device 102 in accordance with user preferences or needs of a user who operates the first wireless communication device 106A. For example, the first wireless communication device 106A may be configured to communicate with the repeater device 102 in a specific frequency (of user's choice), may remotely power OFF or power ON the repeater device 102. Moreover, other operations, such increase in signal power, decrease in signal power, change in connection frequency between the repeater device 102 and the first wireless communication device 106A may be executed. Such operations may not be allowed (or may not be performed) by other devices (i.e., other wireless communication devices of the plurality of wireless communication devices 106). Thus, other users are eliminated to use the repeater device 102. Alternatively stated, the repeater device 102 exclusively mimics all the parameters of the modem of the first wireless communication device 106A, such as radio timing, and the radio states. The repeater device 102 do not pollute (i.e., does not cause any interference or affect any operations of) other wireless communication devices in the physical enclosure 108 but works only with the first wireless communication device 106A or electronic accessories associated with the first wireless communication device 106A.

Figure 2A:
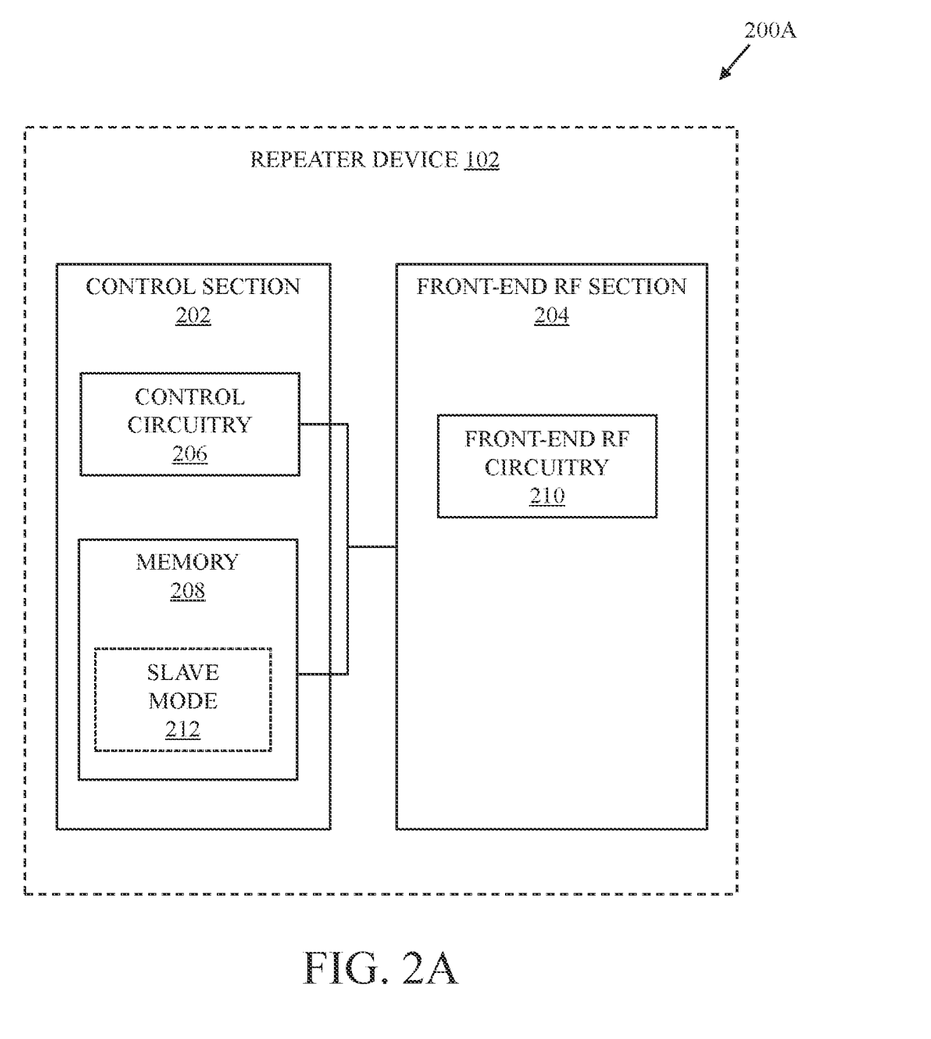
FIG. 2A is a block diagram that illustrates various components of an exemplary repeater device with a slave mode, in accordance with an exemplary embodiment of the disclosure.

FIG. 2A is a block diagram that illustrates various components of an exemplary repeater device with a slave mode, in accordance with an exemplary embodiment of the disclosure. FIG. 2A is explained in conjunction with elements from FIG. 1. With reference to FIG. 2A, there is shown a block diagram 200A of the repeater device 102. The repeater device 102 may include a control section 202 and a front-end RF section 204. The control section 202 may include control circuitry 206 and a memory 208. The control section 202 may be communicatively coupled to the front-end RF section 204. The front-end RF section 204 may include front-end RF circuitry 210.

The control circuitry 206 include suitable logic, circuitry, and/or interfaces configured to control the front-end RF circuitry 210. The repeater device 102 may be a programmable device, where the control circuitry 206 may execute instructions stored in the memory 208. Example of the implementation of the control circuitry 206 may include, but are not limited to an embedded processor, a digital signal processor, a microcontroller, a specialized DSP, a Reduced Instruction Set Computing (RISC) processor, an Application-Specific Integrated Circuit (ASIC) processor, a Complex Instruction Set Computing (CISC) processor, and/or other processors.

The memory 208 may include suitable logic, circuitry, and/or interfaces that may be configured to store instructions executable by the control circuitry 206. Examples of implementation of the memory 208 may include, but not limited to, a random access memory (RAM), a dynamic random access memory (DRAM), a static random access memory (SRAM), a processor cache, a thyristor random access memory (T-RAM), a zero-capacitor random access memory (Z-RAM), a read only memory (ROM), a hard disk drive (HDD), a secure digital (SD) card, a flash drive, cache memory, and/or other non-volatile memory. It is to be understood by a person having ordinary skill in the art that the control section 202 may further include one or more other components, such as an analog to digital converter (ADC), a digital to analog (DAC) converter, a cellular modem, and the like, known in the art, which are omitted for brevity. In an implementation, the memory 208 may be configured to store configurations related to a first operating mode and a second operating mode (i.e., the slave mode 212).

The front-end RF circuitry 210 supports multiple-input multiple-output (MIMO) operations, and may be configured to execute MIMO communication with the base station 104 and one or more end-user devices, such as the first wireless communication device 106A. In an implementation, the MIMO communication may be executed at a sub 6 gigahertz (GHz) frequency that is less than the frequency of the mmWave RF signal received from the base station 104. The mmWave RF signal is received at a first frequency, whereas the MIMO communication is executed at a different frequency, such as sub 6 gigahertz, with the first wireless communication device 106A. This mode of operation is beneficial and advantageous, given that the propagation at lower frequency (sub 6 GHz) results in rich scattering channel response, which leads to better MIMO capacity and MIMO performance. In another implementation, the front-end RF circuitry 210 may communicate both with the base station 104 in uplink and the first wireless communication device 106A in downlink at same or different mmWave frequencies.

In an implementation, the front-end RF circuitry 210 may include receiver circuitry and transmitter circuitry. In this case, the receiver circuitry may be configured to receive RF signals from the base station 104 and one or more of the plurality of wireless communication devices 106. In the slave mode 112, however, the front-end RF circuitry 210 may communicate exclusively with the first wireless communication device 106A of the plurality of wireless communication devices 106 in accordance to a user preference set at the first wireless communication device 106A. The front-end RF circuitry 210 supports multiple communication protocols, such as 5G, 4G LTE, and other RF signals, such as Wi-Fi (e.g., 2.4 GHz or 5 GHz), Bluetooth signals, or wireless personal area network signals, or a combination thereof. In an example, the receiver circuitry may include a cascading receiver chain comprising various components (e.g., an antenna array, a set of low noise amplifiers (LNA), a set of receiver front end phase shifters, and a set of power combiners) for the signal reception (not shown for brevity). The transmitter circuitry may be configured to transmit RF signals to the base station 104 in the uplink communication and to the first wireless communication device 106A in the downlink communication. In an example, the transmitter circuitry may include a cascading transmitter chain comprising various components for baseband signal processing or digital signal processing. In accordance with an embodiment, the front-end RF circuitry 210 may receive input RF signals and transmit the one or more RF signals in accordance with multiple-input multiple-output (MIMO) reception and transmission.

In operation, the control circuitry 206 of the repeater device 102 may be configured to receive a request from the first wireless communication device 106A. In an exemplary implementation, the request may be a connection request from one of the plurality of wireless communication devices 106, such as the first wireless communication device 106A. The connection request may be received over a cellular network or a personal area network, such as a Wi-Fi, Li-Fi, Bluetooth, and the like. In such a case, the control circuitry 206 may be configured to establish a wireless connection with the first wireless communication device 106A based on the request received from the first wireless communication device 106A. The request may be communicated by the first wireless communication device 106A using a user interface (UI) installed at the first wireless communication device 106A.

Initially, the repeater device 102 may be switched OFF or may be operating in a first operating mode, which may be referred to as a normal mode. In the first operating mode, the repeater device 102 may not be synched with the base station 104 in terms of network time synchronization and may operate like a regular or off-the-shelf deployed repeater device. The repeater device 102 may communicate with the base station 104 in the first operating mode in which the data is received in a first data rate. The communication may occur over a RF signal, which may be a mmWave signal or may not be a mmWave signal (e.g., a 4G LTE signal). On the other side, initially, the first wireless communication device 106A may or may not be attached to a cellular network. Moreover, the first wireless communication device 106A may be configured to receive data over a radio frequency signal from the base station 104 directly without using the repeater device 102. Alternatively, the first wireless communication device 106A and other wireless communicating devices of the plurality of wireless communicating devices 106 may be receiving data from the base station 104 via the same repeater device 102 that is operating in the first operating mode. In this case where different users share the repeater device 102 enabled resources (e.g., enhanced signals and/or bandwidth), the different users may have different needs and preferences, and a given user may not want to share repeater enabled resources with other users. For example, the first wireless communication device 106A may not want to share the resources of the repeater device 102 with other wireless communication devices, and may want to communicate (send/receive) huge amount of data (e.g., for data communication in a multi-gigabit data rate) over the cellular network, which may be difficult or very limiting over the existing connection over the cellular network without the repeater device 102 (or via the repeater device 102 that is in first operating mode (i.e. normal mode) providing signals to the plurality of wireless communication devices 106). Thus, in order to switch the operating mode of the repeater device 102, the first wireless communication device 106A may use the UI to send an operating mode change signal to the repeater device 102.

The control circuitry 206 may be further configured to receive the operating mode change signal from the first wireless communication device 106A to switch the repeater device 102 from the first operating mode to a second operating mode. The second operating mode is the slave mode 212. It is to be understood that the operating mode change signal can be communicated even before the wireless connection is established with the repeater device 102, for example, as a broadcast, over cellular network, or directly without the need to first pair with the repeater device 102.

The control circuitry 206 may be further configured to activate the slave mode 212 in the repeater device 102 based on the request received from the first wireless communication device 106A. In this case, the request may include the operating mode change signal which may be an instruction for the repeater device 102 to activate the slave mode 212. The slave mode 212 refers to a new operating mode of the repeater device 102, in which the repeater device 102 operates exclusively (i.e. works only) with the first wireless communication device 106A or electronic accessories associated with the first wireless communication device 106A and does not cause any interference or affect any operations of other wireless communication devices of the plurality of wireless communication devices 106 present in vicinity of the first wireless communication device 106A (e.g. the smartphone).

The control circuitry 206 is further configured to receive a first radio frequency signal from the base station 104 and acquire timing information of the base station 104. When the slave mode 212 is activated, the control circuitry 206 may then acquire timing information of the base station 104 for network time synchronization. In some implementations, the network timing information of the base station 104 for network time synchronization is acquired as default settings as soon as the repeater device 102 is switched ON. Thereafter, the control circuitry 206 is further configured to execute a network time synchronization with the base station 104 based on the acquired timing information of the base station 104, where the repeater device 102 in the slave mode 212 acts as a slave of the base station 104 based on the network time synchronization. In an example, time synchronization may be a distribution of an absolute time reference to one or more real-time clocks, where synchronized clocks have a common epoch timescale. The control circuitry 206 may be configured to synchronize (i.e., sync) with the base station 104, where the repeater device 102 then acts as a slave of the base station 104. In other words, based on the synchronization, the repeater device 102 may be configured to function as a remote antenna for the base station 104 or a remote radio for the base station 104. Alternatively stated, the control circuitry 206 is further configured to cause the repeater device 102 to function as a remote antenna for the base station 104 or a remote radio for the base station 104 in the slave mode 212.

In accordance with an embodiment, in addition to the network time synchronization, the control circuitry 206 is further configured to execute a phase and a frequency synchronization with the base station 104 based on the received first radio frequency signal from the base station 104 and the acquired timing information. Two or more signals of the same frequency are considered to be in-phase if their rising edges or the falling edges are aligned and occur at the same time. The control circuitry 206 achieves both phase and frequency synchronization with the base station 104 with improved accuracy, for example, less than 100 nanoseconds.

In some implementations, the control circuitry 206 may in advance and as a default setting execute synchronization of network time, phase, and frequency with the base station 104 without waiting for any operating mode change signal from the first wireless communication device 106A. In such a case, when the slave mode 212 is activated, only then synchronization with the modem 226 of the first wireless communication device 106A is executed, which makes the processing very fast.

In accordance with an embodiment, the control circuitry 206 is further configured to execute a synchronization with the modem 226 of the first wireless communication device 106A in which the repeater device 102 in the slave mode 212 follows radio signals and a radio state of the modem 226 of the first wireless communication device 106A. When the synchronization is executed, the front-end RF circuitry 210 of the repeater device 102 acts as a remote radio (e.g., remote modem) of the first wireless communication device 106A, where the repeater device 102 is re-configured to operate on almost same timing and operate almost same or similar feature as of the modem or radio of the first wireless communication device 106A. For example, whenever the first wireless communication device 106A (i.e., modem of the first wireless communication device 106A) comes out of sleep mode or idle mode, and becomes activated, the repeater device 102 also activates in real time or near real time. The repeater device 102 may be configured to follow and synchronize the radio signaling from the first wireless communication device 106A. For example, a change in the radio state of the modem of the first wireless communication device 106A, such as radio ON, radio OFF, go to idle mode, go to sleep mode, or change to transmit mode at the time of data transmission, or change to receive mode if time to receive data, is relayed to the repeater device 102. The modem of the first wireless communication device 106A may be a front-end radio frequency circuitry or a part thereof. The repeater device 102 follows such signaling (i.e., a current state of the radio state), and becomes dedicated exclusively to the first wireless communication device 106A. Thus, in such scenarios, only the first wireless communication device 106A may be configured to control the repeater device 102. For example, any input command may be provided to the repeater device 102 by the first wireless communication device 106A. Alternatively stated, the control circuitry 206 is further configured to exclusively communicate with the first wireless communication device 106A of the plurality of wireless communication devices 106 in a specific frequency in accordance with a user preference set at the first wireless communication device 106A. Thus, the first wireless communication device 106A may be configured to control various operations of the repeater device 102 in accordance with user preferences or needs of a user who operates the first wireless communication device 106A. For example, the first wireless communication device 106A may be configured to communicate with the repeater device 102 in a specific frequency (of user's choice), may remotely power OFF or power ON the repeater device 102. Moreover, other operations, such increase in signal power, decrease in signal power, change in connection frequency between the repeater device 102 and the first wireless communication device 106A may be executed. Such operations may not be allowed (or may not be performed) by other devices (i.e., other wireless communication devices of the plurality of wireless communication devices 106). Thus, other users are eliminated to use the repeater device 102. Alternatively stated, the repeater device 102 exclusively mimics all the parameters of the modem of the first wireless communication device 106A, such as radio timing, and the radio states. The repeater device 102 do not pollute (i.e., does not cause any interference or affect any operations of) other wireless communication devices in the physical enclosure 108 but works only with the first wireless communication device 106A or electronic accessories associated with the first wireless communication device 106A.

Thus, as discussed, the control circuitry 206 may communicate data in the first data rate to the first wireless communication device 106A when the repeater device 102 is in the first operating mode. However, as soon as the slave mode 212 is activated, the control circuitry 206 is further configured to communicate the data in a second data rate (e.g., in multi-gigabit rate and improved latency) to the first wireless communication device 106A that is higher than the first data rate when the repeater device 102 is switched to the second operating mode that corresponds to the slave mode 212.

Figure 2B:
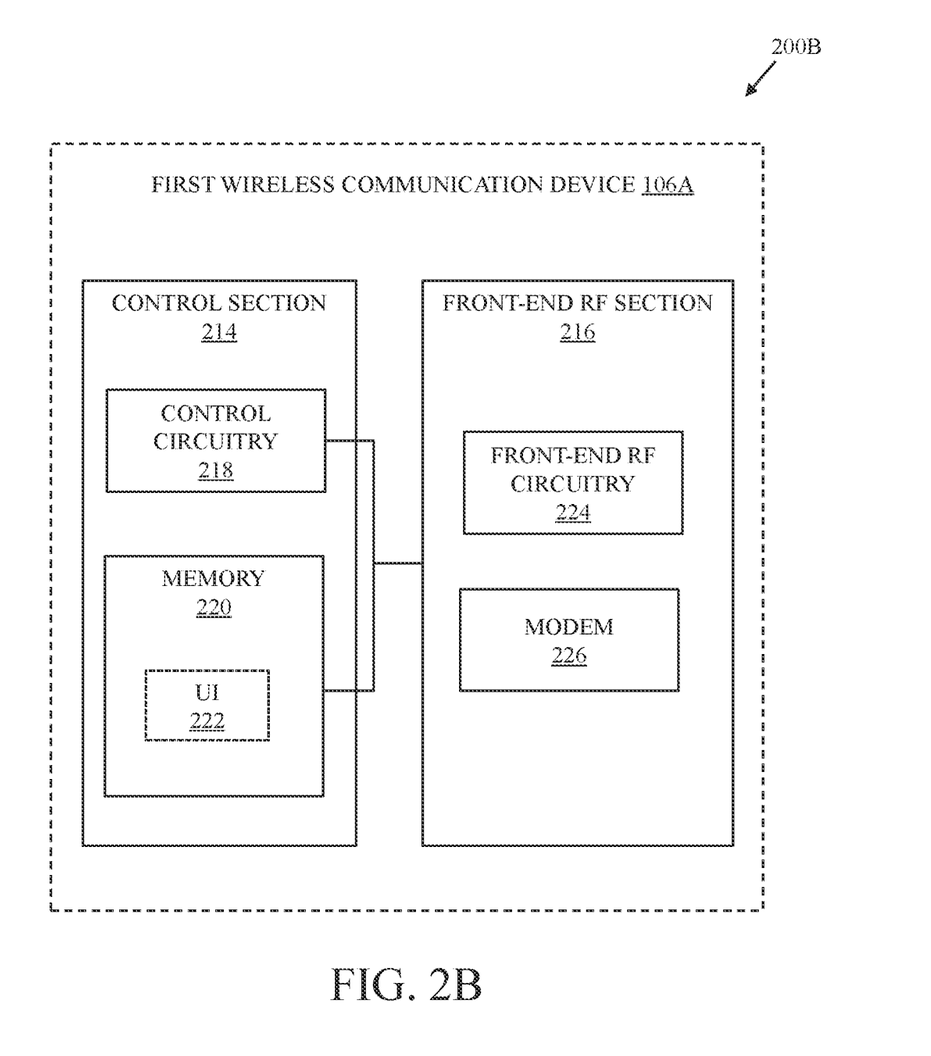
FIG. 2B is a block diagram that illustrates various components of an exemplary first wireless communication device, in accordance with an exemplary embodiment of the disclosure.

FIG. 2B is a block diagram that illustrates various components of an exemplary first wireless communication device, in accordance with an exemplary embodiment of the disclosure. FIG. 2B is explained in conjunction with elements from FIG. 1 and FIG. 2A. With reference to FIG. 2B, there is shown a block diagram 200B of the first wireless communication device 106A. The first wireless communication device 106A may include a control section 214 and a front-end RF section 216. The control section 214 may include control circuitry 218 and a memory 220. Examples of implementation of the control circuitry 218 and the memory 220 may be same or similar to that of the control circuitry 206 and the memory 208 respectively of FIG. 2A. There is further shown an application interface, such as a UI 222 in the memory 220. The control section 214 may be communicatively coupled to the front-end RF section 216. The front-end RF section 216 may include front-end RF circuitry 224 and a modem 226. Examples of the implementation of the modem 226 include, but is not limited to a mobile broadband modem, a cellular modem, or other wireless modem. The modem 226 may be a hardware component that allows a communication device to connect to the Internet, for example, via a mobile broadband connection (e.g., using a SIM).

In operation, the control circuitry 218 may be configured to receive data over a first radio frequency (RF) signal from the base station 104 directly or via the repeater device 102 that is communicatively coupled to the base station 104. The repeater device 102 may be configured to operate in the first operating mode in which the data is received in a first data rate. Initially, the first wireless communication device 106A may or may not be attached to a cellular network. In a case where the first wireless communication device 106A (e.g., a smartphone or a CPE) is not attached to the cellular network but wants to communicate with a cellular network, a network mode of the modem 226 of the first wireless communication device 106A may be turned ON from a sleep mode to active mode (i.e., the modem 226 may be activated), which in turn activates radio (e.g., is able to receive radio frequency signals for initial access). Thereafter, the first wireless communication device 106A may become attached to the cellular network (i.e., a carrier frequency may be assigned to the first wireless communication device 106A by the base station 104). Once the first wireless communication device 106A becomes attached to the cellular network, data communication may be executed. In other words, the first wireless communication device 106A may be in a radio resource control (RRC) connected state to the base station 104 over the cellular network. Further, in the RRC connected state, and in a first scenario, the first wireless communication device 106A may be configured to receive data over the first radio frequency signal from the base station 104 directly without using the repeater device 102. Alternatively, in another scenario, the first wireless communication device 106A and other wireless communicating devices of the plurality of wireless communicating devices 106 may be receiving data from the base station 104 via the same repeater device 102 that is operating in the first operating mode.

A user of the first wireless communication device 106A may provide an input using the UI 222. The control circuitry 218 may be configured to execute a search to discover the repeater device 102. Based on the executed search, the first wireless communication device 106A may be configured to send a request, which may include an operating mode change signal, to the repeater device 102. In other words, the control circuitry 218 may be configured to receive the user input to communicate the operating mode change signal to the repeater device 102 to change an operating mode of the repeater device 102 from the first operating mode to the second operating mode. The second operating mode is the slave mode 212 that is activated in the repeater device 102 based on the operating mode change signal.

In accordance with an embodiment, firstly the control circuitry 218 may be configured to send a request to establish a wireless connection with the repeater device 102. Thereafter, once the wireless connection is established, the control circuitry 218 communicates the operating mode change signal to the repeater device 102 for activation of the slave mode. Alternatively, in some implementations, the operating mode change signal may be communicated even before the wireless connection is established.

The control circuitry 218 is further configured to execute a synchronization of the modem 226 of the first wireless communication device 106A with the repeater device 102. The repeater device 102 in the slave mode 212 follows radio signals and a radio state of the modem 226 of the first wireless communication device 106A based on the synchronization. The radio state of the modem 226 may correspond to a sleep mode (or an idle mode) or an active mode (e.g., transmit-receive mode actively receiving or transmitting RF signals). When the synchronization is executed, the front-end RF circuitry 210 of the repeater device 102 acts as a remote radio (e.g., remote modem) of the first wireless communication device 106A, where the repeater device 102 is re-configured to operate on almost the same timing and operate almost the same or similar feature as of the modem 226 of the first wireless communication device 106A. The repeater device 102 follows such signaling (i.e., a current state of the radio state), and becomes dedicated exclusively to the first wireless communication device 106A. Thus, in such scenarios, only the first wireless communication device 106A may be configured to control the repeater device 102.

In accordance with an embodiment, the control circuitry 218 is further configured to control the repeater device 102 to cause the repeater device 102 to execute a network time synchronization with the base station 104, where the repeater device 102 in the slave mode 212 acts as a slave of the base station 104 as well as the first wireless communication device 106A. Based on the activation of the slave mode 212 in the repeater device 102, the network time synchronization is executed by the repeater device 102. However, in a case where the repeater device 102 is not adequately synched, the control circuitry 218 may be configured to detect such out-of-sync repeater device, such as the repeater device 102, and direct re-synchronization of the repeater device 102 with the base station 104 such that the repeater device 102 acts as a remote radio f the base station 104. The control circuitry 218 may be configured to control various operations of the repeater device 102 in accordance with user preferences or needs of a user who operates the first wireless communication device 106A. Alternatively stated, the control circuitry 218 is further configured to control the repeater device 102 in accordance with one or more user preferences set at the first wireless communication device 106A. For example, the control circuitry 218 may be configured to communicate with the repeater device 102 in a specific frequency (of user's choice), which avoids or at least reduces the interference of airwaves with other wireless communication devices of the plurality of wireless communication devices 106 in the same area, such as the physical enclosure 108. In another example, the control circuitry 218 may be configured to remotely power OFF or power ON the repeater device 102. Moreover, other operations, such as an increase in signal power, a decrease in signal power, a change in connection frequency between the repeater device 102 and the first wireless communication device 106A may be executed using the UI 222. Such operations may not be allowed (or may not be performed) by other devices (i.e., other wireless communication devices of the plurality of wireless communication devices 106). Thus, other users are eliminated to use the repeater device 102. Thus, the control circuitry 218 is further configured to control the repeater device 102 to cause the repeater device 102 to function as a remote antenna for the base station 104 or a remote radio for the base station 104 in the slave mode 212.

In some embodiments, the control circuitry 218 is further configured to control the repeater device 102 to cause the repeater device 102 to execute the phase and the frequency synchronization with the base station 104 in the slave mode 112. Alternatively stated, based on the activation of the slave mode 212, the repeater device 102 becomes a slave of the base station 104 as well as the first wireless communication device 106A such that the repeater device 102 exclusively mimics all the parameters of the modem 226 of the first wireless communication device 106A, such as radio timing, and the radio states.

The control circuitry 218 is further configured to obtain data over a second RF signal in a second data rate via the repeater device 102 configured to operate in the slave mode 212. The second data rate is higher than the first data rate. Any data, such as video, 4K video, 8K video or other data can be acquired at a higher data rate, such as multi-gigabit data rate, in the slave mode 212 as all the resources of the repeater device 102 are dedicated exclusively to the first wireless communication device 106A and communication is achieved without any interference or at substantially reduced interference.

Figure 3A:
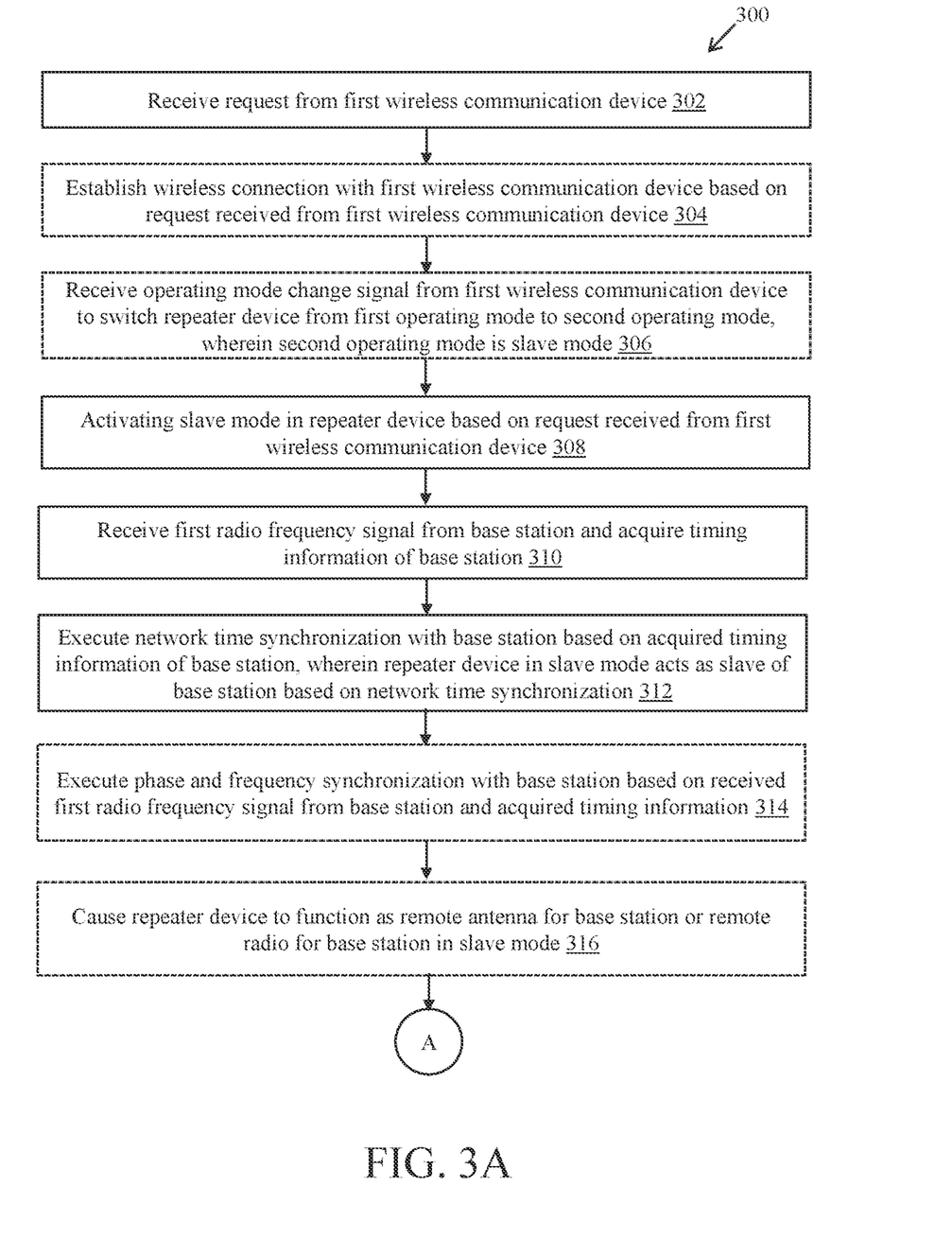
FIG. 3A and FIG. 3B, collectively, is a flowchart that illustrates an exemplary method for operating the repeater device for high performance communication, in accordance with an embodiment of the disclosure.
Figure 3B:
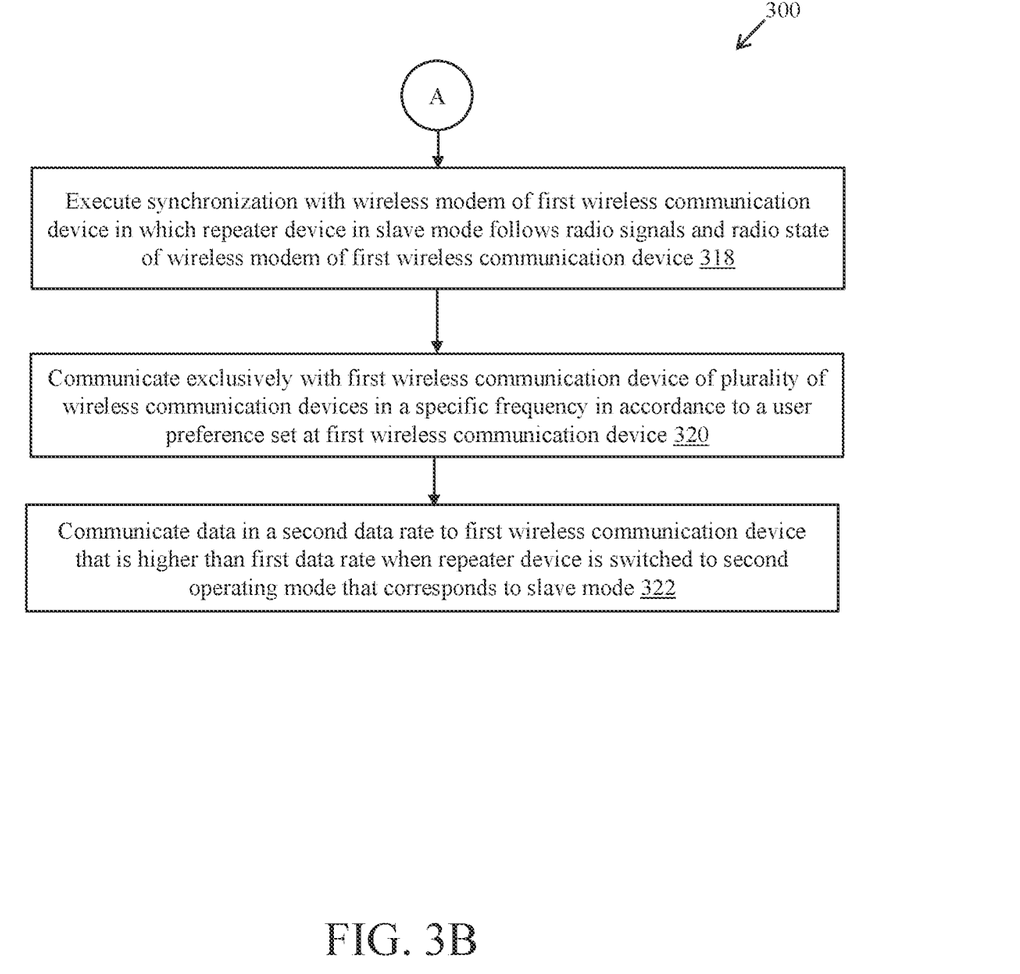

FIG. 3A and FIG. 3B, collectively, is a flowchart that illustrates an exemplary method for operating the repeater device for high performance communication, in accordance with an embodiment of the disclosure. FIGS. 3A and 3B are explained in conjunction with elements from FIGS. 1, 2A, and 2B. With reference to FIGS. 3A and 3B, there is shown a flowchart 300 comprising exemplary operations 302 through 322. The method of the flowchart 300 is executed by the repeater device 102, which may also be referred to as a slave repeater device having the slave mode 212.

At 302, a request may be received from the first wireless communication device 106A by the repeater device 102. The control circuitry 206 may be configured to receive the request from the first wireless communication device 106A.

At 304, a wireless connection may be established with the first wireless communication device 106A based on the request received from the first wireless communication device 106A. The control circuitry 206 may be further configured to establish the wireless connection with the first wireless communication device 106A based on the request received from the first wireless communication device 106A.

At 306, an operating mode change signal may be received from the first wireless communication device 106A to switch the repeater device 102 from a first operating mode to a second operating mode, where the second operating mode is the slave mode 212. The control circuitry 206 may be further configured to receive the operating mode change signal from the first wireless communication device 106A to switch the repeater device 102 from the first operating mode to the second operating mode.

At 308, a slave mode may be activated in the repeater device 102 based on a request received from a first wireless communication device 106A. The control circuitry 206 may be further configured to activate the slave mode in the repeater device 102 based on a request received from a first wireless communication device 106A.

At 310, a first radio frequency signal may be received from the base station 104 and timing information of the base station 104 is acquired. The control circuitry 206 may be further configured to receive the first radio frequency signal from the base station 104 and acquire the timing information of the base station 104.

At 312, a network time synchronization may be executed with the base station 104 based on the acquired timing information of the base station 104, where the repeater device 102 in the slave mode 212 acts as a slave of the base station 104 based on the network time synchronization. The control circuitry 206 may be further configured to execute the network time synchronization with the base station 104 based on the acquired timing information of the base station 104.

At 314, a phase and a frequency synchronization may be executed with the base station 104 based on the received first radio frequency signal from the base station 104 and the acquired timing information. In some implementation, the control circuitry 206 may be further configured to execute the phase and the frequency synchronization with the base station 104.

At 316, the repeater device 102 is caused to function as a remote antenna for the base station 104 or a remote radio for the base station 104 in the slave mode 212. The control circuitry 206 may be further configured to cause the repeater device 102 to function as the remote antenna or a remote radio for the base station 104 in the slave mode 212.

At 318, a synchronization is executed with the modem 226 of the first wireless communication device 106A in which the repeater device 102 in the slave mode 212 follows radio signals and a radio state of the modem 226 of the first wireless communication device 106A. The control circuitry 206 may be further configured to execute the synchronization with the modem 226 of the first wireless communication device 106A where the repeater device 102 mimics the radio signals and the radio state of the modem 226 of the first wireless communication device 106A.

At 320, it is communicated exclusively with the first wireless communication device 106A of the plurality of wireless communication devices 106 in a specific frequency in accordance to a user preference set at the first wireless communication device 106A. The control circuitry 206 may be further configured to communicate using the front-end RF circuitry 210 exclusively and dedicatedly with the first wireless communication in the slave mode 212.

At 322, data is communicated in a second data rate to the first wireless communication device 106A that is higher than the first data rate when the repeater device 102 is switched to the second operating mode that corresponds to the slave mode 212. The data is initially communicated in the first data rate to the first wireless communication device 106A when the repeater device 102 is in the first operating mode. When the slave mode 212 is activated, the data rate increases to the second data rate. The control circuitry 206 may be further configured to communicate the data, for example, data stream, over a RF signal in the second data rate to the first wireless communication device 106A.

Figure 4:
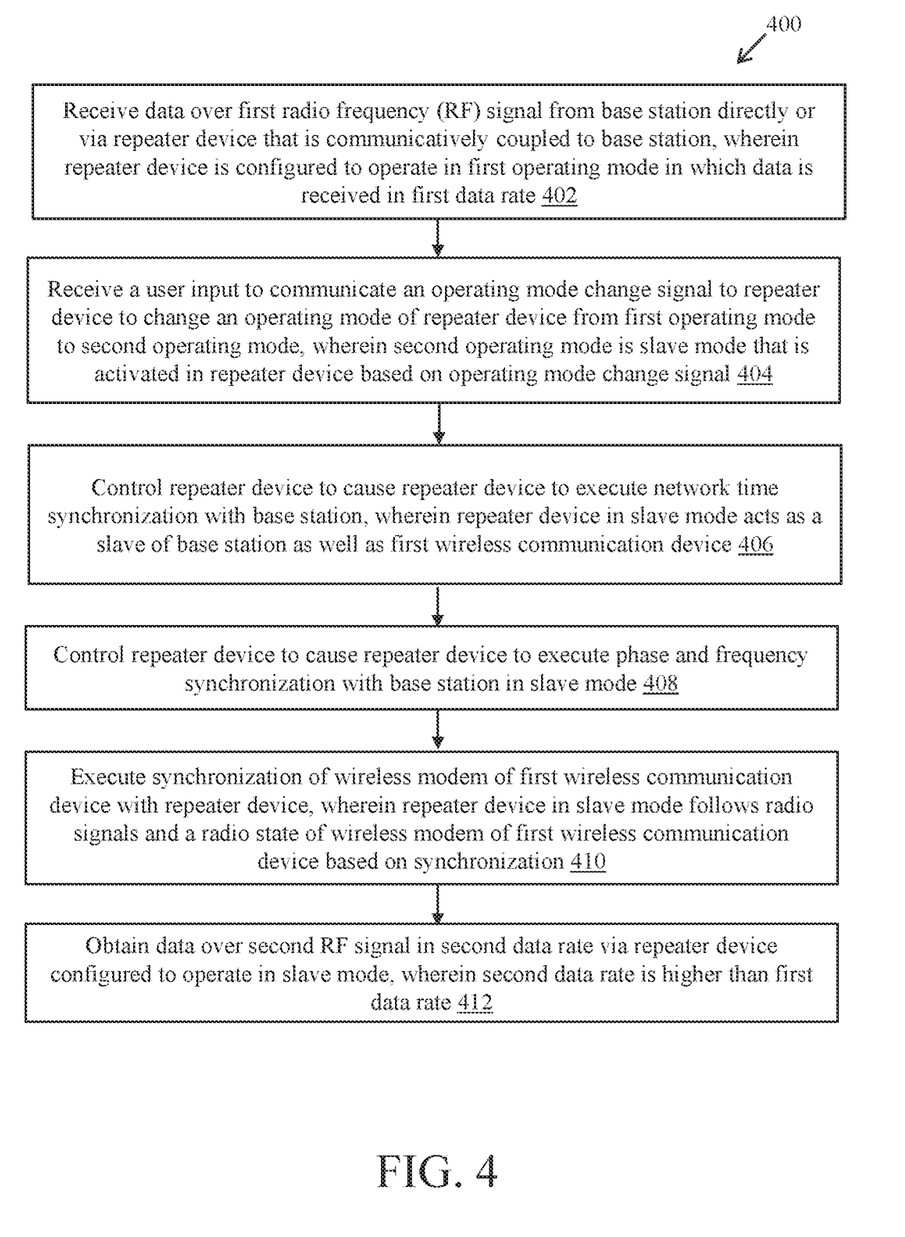
FIG. 4 is a flowchart that illustrates an exemplary method for controlling the repeater device with a slave mode for high performance communication, in accordance with an embodiment of the disclosure.

FIG. 4 is a flowchart that illustrates an exemplary method for controlling the repeater device with a slave mode for high performance communication, in accordance with an embodiment of the disclosure. FIG. 4 is explained in conjunction with elements from FIGS. 1, 2A, and 2B. With reference to FIG. 4, there is shown a flowchart 400 comprising exemplary operations 402 through 412. The method of the flowchart 400 is executed by the first wireless communication device 106A.

At 402, data is received over a first radio frequency (RF) signal from the base station 104 directly or via the repeater device 102 that is communicatively coupled to the base station 104, where the repeater device 102 may be configured to operate in a first operating mode in which the data is received in a first data rate.

At 404, a user input is received to communicate an operating mode change signal to the repeater device 102 to change an operating mode of the repeater device 102 from the first operating mode to a second operating mode, where the second operating mode is the slave mode 212 that is activated in the repeater device 102 based on the operating mode change signal. In accordance with an embodiment, a request may be sent by the first wireless communication device 106A to establish a wireless connection with the repeater device 102.

At 406, the repeater device 102 is controlled to cause the repeater device 102 to execute a network time synchronization with the base station 104, where the repeater device 102 in the slave mode 212 acts as a slave of the base station 104 as well as the first wireless communication device 106A.

At 408, the repeater device 102 is controlled to cause the repeater device 102 to function as a remote antenna for the base station 104 or a remote radio for the base station 104 in the slave mode 212. The control circuitry 218 may be configured to control the repeater device 102 in accordance with one or more user preferences set at the first wireless communication device 106A. In some implementations, in addition to controlling the repeater device 102 for network time synchronization, the repeater device 102 may be controlled to cause the repeater device 102 to execute a phase and a frequency synchronization with the base station 104 in the slave mode 212.

At 410, a synchronization of the modem 226 of the first wireless communication device 106A is executed with the repeater device 102, where the repeater device 102 in the slave mode 212 follows radio signals and a radio state of the modem 226 of the first wireless communication device 106A based on the synchronization.

At 412, data is obtained over a second RF signal in a second data rate via the repeater device 102 configured to operate in the slave mode 212, where the second data rate is higher than the first data rate.

It is to be understood that the operations 402 to 412 are only illustrative and other alternatives can also be provided where one or more steps are added, one or more steps are removed (e.g., the operation 408 may be omitted), or one or more steps are provided in a different sequence without departing from the scope of the claims herein.

Various embodiments of the disclosure may provide the repeater device 102 (FIG. 1). The repeater device 102 includes control circuitry 206 (FIG. 2A) that may be configured to activate the slave mode 212 in the repeater device 102 based on a request received from the first wireless communication device 106A. The control circuitry 206 may be further configured to receive a first radio frequency signal from the base station 104 and acquire timing information of the base station 104. The control circuitry 206 may be further configured to execute a network time synchronization with the base station 104 based on the acquired timing information of the base station 104, wherein the repeater device 102 in the slave mode 212 acts as a slave of the base station 104 based on the network time synchronization. The control circuitry 206 may be further configured to execute a synchronization with the modem 226 of the first wireless communication device 106A in which the repeater device 102 in the slave mode 212 follows radio signals and a radio state of the modem 226 of the first wireless communication device 106A.

Various embodiments of the disclosure may provide the first wireless communication device 106A (FIG. 1). The first wireless communication device 106A comprises control circuitry 218 and the modem 226. The control circuitry 218 may be configured to receive data over a first radio frequency (RF) signal from the base station 104 directly or via the repeater device 102 that is communicatively coupled to the base station 104, where the repeater device 102 may be configured to operate in a first operating mode in which the data is received in a first data rate. The control circuitry 218 is further configured to receive a user input to communicate an operating mode change signal to the repeater device 102 to change an operating mode of the repeater device 102 from the first operating mode to a second operating mode, where the second operating mode is the slave mode 112 that is activated in the repeater device 102 based on the operating mode change signal. The control circuitry 218 is further configured to execute a synchronization of the modem 226 of the first wireless communication device 106A with the repeater device 102, wherein the repeater device 102 in the slave mode 112 follows radio signals and a radio state of the modem 226 of the first wireless communication device 106A based on the synchronization. The control circuitry 218 is further configured to obtain data over a second RF signal in a second data rate via the repeater device 102 configured to operate in the slave mode 212, where the second data rate is higher than the first data rate.

Various embodiments of the disclosure may provide a non-transitory computer-readable medium having stored thereon computer implemented instruction that when executed by a communication device (e.g., the repeater device 102) causes the communication device to execute operations that includes activating a slave mode in the communication device based on a request received from another communication device (e.g., the first wireless communication device 106A). The operations further include receiving a first radio frequency signal from the base station 104 and acquiring timing information of the base station 104. The operations further include executing a network time synchronization with the base station 104 based on the acquired timing information of the base station 104, wherein the communication device in the slave mode 212 acts as a slave of the base station 104 based on the network time synchronization. The operations further include executing a synchronization with the modem of the other communication device (e.g., the first wireless communication device 106A) in which the communication device (e.g., the repeater device 102) in the slave mode 212 follows radio signals and a radio state of the modem of the other communication device (e.g., the first wireless communication device 106A).

While various embodiments described in the present disclosure have been described above, it should be understood that they have been presented by way of example, and not limitation. It is to be understood that various changes in form and detail can be made therein without departing from the scope of the present disclosure. In addition to using hardware (e.g., within or coupled to a central processing unit ("CPU"), microprocessor, micro controller, digital signal processor, processor core, system on chip ("SOC") or any other device), implementations may also be embodied in software (e.g., computer readable code, program code, and/or instructions disposed in any form, such as source, object or machine language) disposed for example in a non-transitory computer-readable medium configured to store the software. Such software can enable, for example, the function, fabrication, modeling, simulation, description and/or testing of the apparatus and methods describe herein. For example, this can be accomplished through the use of general program languages (e.g., C, C++), hardware description languages (HDL) including Verilog HDL, VHDL, and so on, or other available programs. Such software can be disposed in any known non-transitory computer-readable medium, such as semiconductor, magnetic disc, or optical disc (e.g., CD-ROM, DVD-ROM, etc.). The software can also be disposed as computer data embodied in a non-transitory computer-readable transmission medium (e.g., solid state memory any other non-transitory medium including digital, optical, analog-based medium, such as removable storage media). Embodiments of the present disclosure may include methods of providing the apparatus described herein by providing software describing the apparatus and subsequently transmitting the software as a computer data signal over a communication network including the internet and intranets.

It is to be further understood that the system described herein may be included in a semiconductor intellectual property core, such as a microprocessor core (e.g., embodied in HDL) and transformed to hardware in the production of integrated circuits. Additionally, the system described herein may be embodied as a combination of hardware and software.

What is claimed is:

1. A repeater device, comprising:
control circuitry configured to:
activate a slave mode in the repeater device based on a request received from a first wireless communication device;
receive a first radio frequency signal from a base station and acquire timing information of the base station;
execute a network time synchronization with the base station based on the acquired timing information of the base station, wherein the repeater device in the slave mode, acts as a slave of the base station based on the network time synchronization; and
execute a synchronization with a modem of the first wireless communication device in which the repeater device in the slave mode follows radio signals and a radio state of the modem of the first wireless communication device.

2. The repeater device according to claim 1, wherein the control circuitry is further configured to establish a wireless connection with the first wireless communication device based on the request received from the first wireless communication device.

3. The repeater device according to claim 1, wherein the control circuitry is further configured to cause the repeater device to function as a remote antenna for the base station or a remote radio for the base station in the slave mode.

4. The repeater device according to claim 1, wherein the control circuitry is further configured to execute a phase and a frequency synchronization with the base station based on the first radio frequency signal received from the base station and the acquired timing information.

5. The repeater device according to claim 1, wherein the control circuitry is further configured to receive an operating mode change signal from the first wireless communication device to switch the repeater device from a first operating mode to a second operating mode, wherein the second operating mode is the slave mode.

6. The repeater device according to claim 5, wherein the control circuitry is further configured to communicate data in a first data rate in the first operating mode to the first wireless communication device, and wherein the first data rate is increased to a second data rate in the second operating mode that corresponds to the slave mode.

7. The repeater device according to claim 1, wherein the control circuitry is further configured to communicate exclusively with the first wireless communication device of a plurality of wireless communication devices in accordance to a user preference set at the first wireless communication device.

8. The method according to claim 7, further comprising communicating exclusively with the first wireless communication device of a plurality of wireless communication devices in a specific frequency in accordance to a user-preference set at the first wireless communication device.

9. A method of operating a repeater device, comprising:
activating, by control circuitry, a slave mode in the repeater device based on a request received from a first wireless communication device;
receiving, by the control circuitry, a first radio frequency signal from a base station and acquiring timing information of the base station;
executing, by the control circuitry, a network time synchronization with the base station based on the acquired timing information of the base station, wherein the repeater device in the slave mode acts as a slave of the base station based on the network time synchronization; and
executing, by the control circuitry, a synchronization with a modem of the first wireless communication device in which the repeater device in the slave mode follows radio signals and a radio state of the modem of the first wireless communication device.

10. The method according to claim 9, further comprising establishing a wireless connection with the first wireless communication device based on the request received from the first wireless communication device.

11. The method according to claim 9, further comprising causing the repeater device to function as a remote antenna for the base station or a remote radio for the base station in the slave mode.

12. The method according to claim 9, further comprising executing a phase and a frequency synchronization with the base station based on the first radio frequency signal received from the base station and the acquired timing information.

13. The method according to claim 9, further comprising receiving an operating mode change signal from the first wireless communication device to switch the repeater device from a first operating mode to a second operating mode, wherein the second operating mode is the slave mode.

14. The method according to claim 13, further comprising:
communicating data in a first data rate to the first wireless communication device when the repeater device is in the first operating mode, and
communicating the data in a second data rate to the first wireless communication device that is higher than the first data rate when the repeater device is switched to the second operating mode that corresponds to the slave mode.

15. A first wireless communication device for controlling a repeater device, comprising:
control circuitry and a modem, wherein the control circuitry is configured to:
receive data over a first radio frequency (RF) signal from a base station directly or via the repeater device that is communicatively coupled to the base station, wherein the repeater device is configured to operate in a first operating mode in which the data is received in a first data rate;
receive a user input to communicate an operating mode change signal to the repeater device to change an operating mode of the repeater device from the first operating mode to a second operating mode, wherein the second operating mode is a slave mode that is activated in the repeater device based on the operating mode change signal;
execute a synchronization of the modem of the first wireless communication device with the repeater device, wherein the repeater device in the slave mode follows radio signals and a radio state of the modem of the first wireless communication device based on the synchronization; and
obtain data over a second RF signal in a second data rate via the repeater device configured to operate in the slave mode, wherein the second data rate is higher than the first data rate.

16. The first wireless communication device according to claim 15, wherein the control circuitry is further configured to send a request to establish a wireless connection with the repeater device.

17. The first wireless communication device according to claim 15, wherein the control circuitry is further configured to control the repeater device in accordance with one or more user preferences set at the first wireless communication device.

18. The first wireless communication device according to claim 15, wherein the control circuitry is further configured to control the repeater device to cause the repeater device to execute a network time synchronization with the base station, wherein the repeater device in the slave mode acts as a slave of the base station as well as the first wireless communication device.

19. The first wireless communication device according to claim 15, wherein the control circuitry is further configured to control the repeater device to cause the repeater device to function as a remote antenna for the base station or a remote radio for the base station in the slave mode.

20. The first wireless communication device according to claim 15, wherein the control circuitry is further configured to control the repeater device to cause the repeater device to execute a phase and a frequency synchronization with the base station in the slave mode.

* * * * *